(12) United States Patent
Kupratis et al.

(10) Patent No.: US 12,503,977 B2
(45) Date of Patent: Dec. 23, 2025

(54) TAILORING AIRCRAFT POWERPLANT SPLIT LINE PARAMETER WITH INFLATABLE BLADDER

(71) Applicant: RTX Corporation, Farmington, CT (US)

(72) Inventors: Daniel B. Kupratis, Wallingford, CT (US); Michael D. Miller, Tucson, AZ (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/628,272

(22) Filed: Apr. 5, 2024

(65) Prior Publication Data

US 2025/0314201 A1 Oct. 9, 2025

(51) Int. Cl.
*F02C 7/04* (2006.01)
*F02C 7/042* (2006.01)

(52) U.S. Cl.
CPC ........ *F02C 7/042* (2013.01); *F05D 2220/323* (2013.01); *F05D 2250/51* (2013.01); *F05D 2250/711* (2013.01); *F05D 2250/712* (2013.01); *F05D 2300/603* (2013.01)

(58) Field of Classification Search
CPC ...... F02C 7/04; F02C 7/042; F05D 2220/323; F05D 2250/51; F05D 2250/711; F05D 2250/712; F05D 2300/603
See application file for complete search history.

(56) References Cited

U.S. PATENT DOCUMENTS

| | | | |
|---|---|---|---|
| 3,611,724 A | 10/1971 | Kutney | |
| 3,967,443 A * | 7/1976 | McMurtry | F02K 1/06 60/226.1 |
| 4,155,221 A | 5/1979 | Dhoore | |
| 8,286,654 B2 | 10/2012 | Prasad | |
| 10,550,797 B2 * | 2/2020 | Howarth | F02K 1/06 |
| 10,738,699 B2 | 8/2020 | Burnside | |
| 2005/0274103 A1 * | 12/2005 | Prasad | B64D 33/02 137/15.1 |
| 2009/0253361 A1 * | 10/2009 | Porte | B64D 33/08 454/76 |

FOREIGN PATENT DOCUMENTS

| | | | |
|---|---|---|---|
| CN | 106523158 A * | 3/2017 | ............ F02C 7/04 |
| GB | 800380 A | 8/1958 | |
| JP | S58107842 A | 6/1983 | |
| WO | 2002036951 A1 | 5/2002 | |

* cited by examiner

*Primary Examiner* — Steven M Sutherland
(74) *Attorney, Agent, or Firm* — Getz Balich LLC

(57) ABSTRACT

An assembly is provided for an aircraft propulsion system. This assembly includes a bladed rotor, an inner flowpath, an outer flowpath, a splitter and a flowpath wall. The bladed rotor is rotatable about an axis. The inner flowpath includes an inner flowpath inlet downstream of the bladed rotor. The outer flowpath includes an outer flowpath inlet downstream of the bladed rotor. The outer flowpath inlet is radially outboard of the inner flowpath inlet. The splitter is disposed radially between and partially forms the inner flowpath inlet and the outer flowpath inlet. The flowpath wall is arranged with the splitter and forms a radial inner peripheral boundary of the outer flowpath. The flowpath wall includes an inflatable bladder and a radial outer surface. The inflatable bladder is configured to change a geometry of the radial outer surface.

20 Claims, 9 Drawing Sheets

TAILORING AIRCRAFT POWERPLANT SPLIT LINE PARAMETER WITH INFLATABLE BLADDER

BACKGROUND OF THE DISCLOSURE

1. Technical Field

This disclosure relates generally to an aircraft propulsion system and, more particularly, to flow splitting within the aircraft propulsion system.

2. Background Information

A turbofan engine for an aircraft propulsion system includes a splitter for splitting incoming air into a core flowpath and a bypass flowpath. Various turbofan engine arrangements are known in the art for tailoring the splitting of the incoming air into the core flowpath and the bypass flowpath. While these known turbofan engine arrangements have various benefits, there is still room in the art for improvement.

SUMMARY OF THE DISCLOSURE

According to an aspect of the present disclosure, an assembly is provided for an aircraft propulsion system. This assembly includes a bladed rotor, an inner flowpath, an outer flowpath, a splitter and a flowpath wall. The bladed rotor is rotatable about an axis. The inner flowpath includes an inner flowpath inlet downstream of the bladed rotor. The outer flowpath includes an outer flowpath inlet downstream of the bladed rotor. The outer flowpath inlet is radially outboard of the inner flowpath inlet. The splitter is disposed radially between and partially forms the inner flowpath inlet and the outer flowpath inlet. The flowpath wall is arranged with the splitter and forms a radial inner peripheral boundary of the outer flowpath. The flowpath wall includes an inflatable bladder and a radial outer surface. The inflatable bladder is configured to change a geometry of the radial outer surface.

According to another aspect of the present disclosure, another assembly is provided for an aircraft propulsion system. This assembly includes a bladed rotor and a flowpath wall. The bladed rotor is rotatable about an axis. The flowpath wall is downstream of the bladed rotor along a flowpath. The flowpath wall includes an inflatable bladder and a radial outer surface that forms a radial inner peripheral boundary of the flowpath. The inflatable bladder is configured to deform the radial outer surface such that, when viewed in a reference plane parallel with the axis: at least a portion of the radial outer surface is convex during a first mode; and at least the portion of the radial outer surface is concave during a second mode.

According to still another aspect of the present disclosure, another assembly is provided for an aircraft propulsion system. This assembly includes a propulsor rotor, an engine core, a flowpath and a flowpath wall. The engine core is configured to drive rotation of the propulsor rotor about an axis. The flowpath is downstream of the propulsor rotor and is disposed outside of the engine core. The flowpath wall forms a radial inner peripheral boundary of the flowpath. The flowpath wall includes an inflatable bladder and a radial outer surface. The inflatable bladder is configured to deform the radial outer surface.

The inflatable bladder may also be configured to deform the radial outer surface such that, when viewed in the reference plane parallel with the axis, at least the portion of the radial outer surface is straight during a third mode.

The inflatable bladder may be located at an inlet into the flowpath.

The bladed rotor may be configured as or otherwise include a fan rotor. The flowpath may be configured as or otherwise include a bypass flowpath.

The assembly may also include an air system fluidly coupled to an interior volume of the inflatable bladder.

The air system may be configured to at least one of: direct air into the interior volume of the inflatable bladder to deform the radial outer surface in a radial outward direction; or direct air out of the interior of the inflatable bladder to deform the radial outer surface in a radial inward direction.

The assembly may also include a compressor section. The inner flowpath may extend through the compressor section. The outer flowpath may bypass the compressor section. The air system may be configured to bleed air from the inner flowpath at the compressor section and direct the air bled from the inner flowpath into the interior volume of the inflatable bladder.

When viewed in a reference plane parallel with the axis, the radial outer surface may have a convex geometry with the inflatable bladder inflated.

When viewed in the reference plane, the radial outer surface may have a straight line geometry with the inflatable bladder partially inflated.

When viewed in the reference plane, the radial outer surface may have a concave geometry with the inflatable bladder deflated.

The inflatable bladder may include a deformable face skin, a rigid backing and an interior volume radially between the deformable face skin and the rigid backing.

The deformable face skin may be configured to rest radially against the rigid backing with the inflatable bladder deflated.

The deformable face skin may be spaced radially from the rigid backing with the inflatable bladder deflated.

The deformable face skin may be configured from or otherwise include a polymer matrix and fiber reinforcement embedded within the polymer matrix. In addition or alternatively, the rigid backing may be configured from or otherwise include metal.

The inflatable bladder may be annular.

The inflatable bladder may be arcuate.

The bladed rotor may be configured as or otherwise include a fan rotor. The inner flowpath may be configured as or otherwise include a core flowpath. The outer flowpath may be configured as or otherwise include a bypass flowpath.

The assembly may also include an engine core configured to drive rotation of the bladed rotor about the axis. The engine core may include a compressor section, a combustor section and a turbine section. The inner flowpath may extend from the inner flowpath inlet, through the compressor section, the combustor section and the turbine section, to an inner flowpath exhaust from the inner flowpath. The outer flowpath may be disposed outside of the engine core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
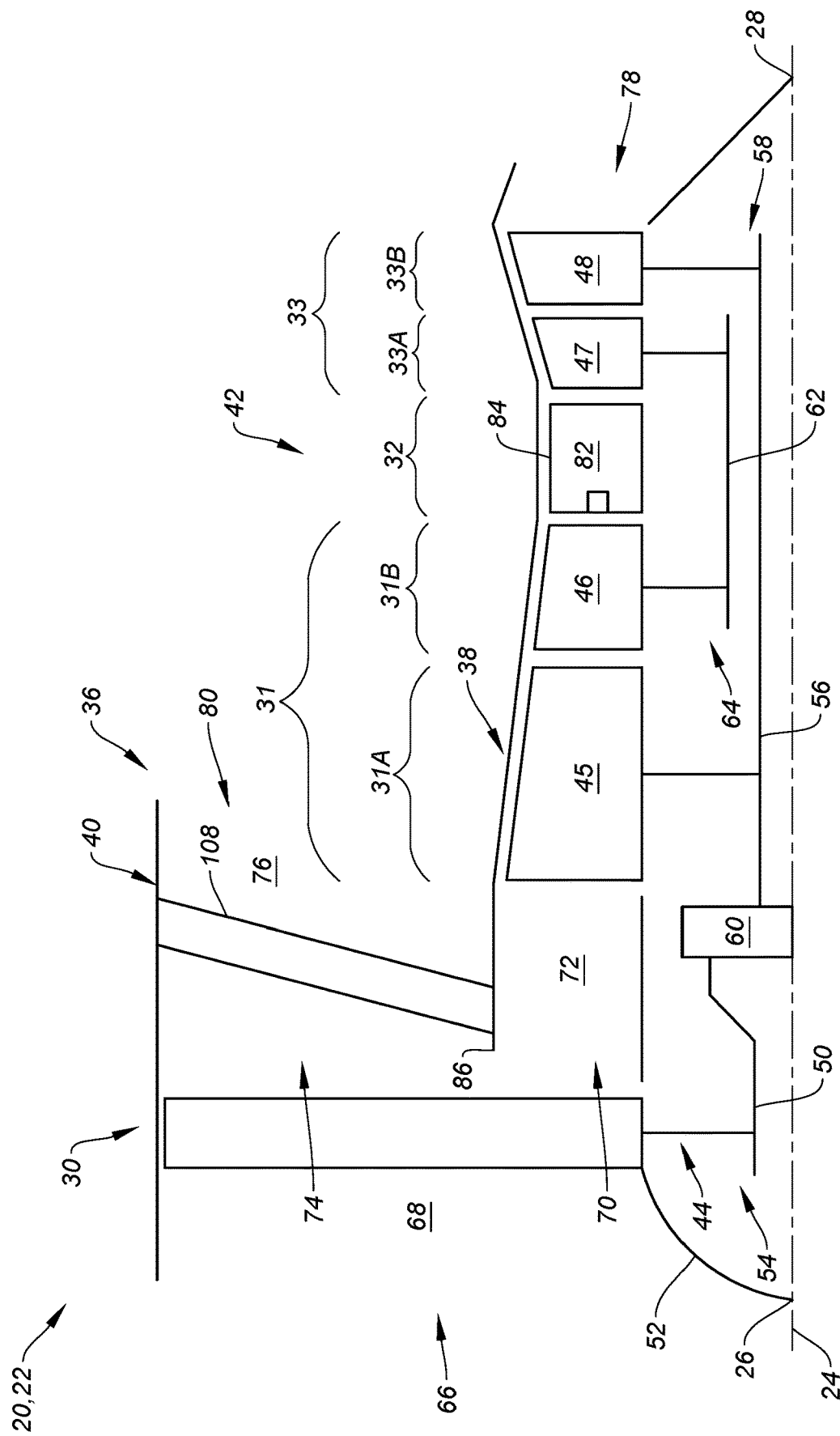
FIG. 1 is a partial schematic illustration of a powerplant for an aircraft propulsion system.

FIG. 1 illustrates a powerplant 20 of a propulsion system for an aircraft. The aircraft may be an airplane, a drone (e.g., an unmanned aerial vehicle (UAV)), or any other manned or unmanned aerial vehicle or system. For ease of description, the aircraft propulsion system is described below as a ducted rotor propulsion system such as a turbofan propulsion system, and the aircraft powerplant 20 is described below as a gas turbine engine 22 such as a turbofan engine. The present disclosure, however, is not limited to such exemplary aircraft propulsion system and/or aircraft powerplant configurations.

The turbine engine 22 extends axially along an axis 24 between a forward, upstream end 26 of the turbine engine 22 and an aft, downstream end 28 of the turbine engine 22. Briefly, the axis 24 may be a centerline axis of the turbine engine 22 and/or one or more of its members. The axis 24 may also or alternatively be a rotational axis for one or more members of the turbine engine 22. The turbine engine 22 of FIG. 1 includes a propulsor section 30 (e.g., a fan section), a compressor section 31, a combustor section 32 and a turbine section 33. The compressor section 31 includes a low pressure compressor (LPC) section 31A and a high pressure compressor (HPC) section 31B. The turbine section 33 includes a high pressure turbine (HPT) section 33A and a low pressure turbine (LPT) section 33B.

The engine sections 30-33B may be arranged sequentially along the axis 24 within an engine housing 36. This engine housing 36 includes an inner housing structure 38 (e.g., a core case structure) and an outer housing structure 40 (e.g., a propulsor case structure). The inner housing structure 38 may house one or more of the engine sections 31A-33B; e.g., a core 42 of the turbine engine 22. The outer housing structure 40 may house at least the propulsor section 30.

The propulsor section 30 includes a bladed propulsor rotor 44; e.g., a fan rotor. The LPC section 31A includes a bladed low pressure compressor (LPC) rotor 45. The HPC section 31B includes a bladed high pressure compressor (HPC) rotor 46. The HPT section 33A includes a bladed high pressure turbine (HPT) rotor 47. The LPT section 33B includes a bladed low pressure turbine (LPT) rotor 48.

The propulsor rotor 44 of FIG. 1 is connected to and rotatable with a propulsor shaft 50; e.g., a fan shaft. The propulsor rotor 44 of FIG. 1 is also connected to and rotatable with a nose cone 52. At least (or only) the propulsor rotor 44, the propulsor shaft 50 and the nose cone 52 collectively form a propulsor rotating assembly 54. This propulsor rotating assembly 54 of FIG. 1 and its members 44, 50 and 52 are rotatable about the axis 24. Here, the nose cone 52 may be referred to as a spinner since the nose cone 52 of FIG. 1 is rotatable with the propulsor rotating assembly 54 and its propulsor rotor 44. It is contemplated, however, the nose cone 52 may alternatively be a stationary member of the turbine engine 22 where, for example, the nose cone 52 is fixed to (or part of) the inner housing structure 38 or another stationary structure of the turbine engine 22.

The LPC rotor 45 is coupled to and rotatable with the LPT rotor 48. The LPC rotor 45 of FIG. 1, for example, is connected to the LPT rotor 48 through a low speed shaft 56. At least (or only) the LPC rotor 45, the LPT rotor 48 and the low speed shaft 56 collectively form a low speed rotating assembly 58; e.g., a low speed spool of the engine core 42. This low speed rotating assembly 58 of FIG. 1 and its members 45, 48 and 56 are rotatable about the axis 24; however, it is contemplated the low speed rotating assembly 58 may alternatively be rotatable about another axis radially and/or angularly offset from the axis 24. Referring again to FIG. 1, the low speed rotating assembly 58 is also coupled to the propulsor rotating assembly 54. The low speed rotating assembly 58 of FIG. 1, for example, is connected to the propulsor rotating assembly 54 through a geartrain 60; e.g., an epicyclic gear system, a transmission, etc. With this arrangement, the low speed rotating assembly 58 and its LPT rotor 48 may rotate at a different (e.g., faster) rotational velocity than the propulsor rotating assembly 54 and its propulsor rotor 44. However, it is contemplated the propulsor rotor 44 may alternatively be coupled to the low speed rotating assembly 58 and its LPT rotor 48 without the geartrain 60 such that the LPT rotor 48 may directly drive rotation of the propulsor rotor 44 through a shaft (e.g., the low speed shaft 56) or a shaft assembly.

The HPC rotor 46 is coupled to and rotatable with the HPT rotor 47. The HPC rotor 46 of FIG. 1, for example, is connected to the HPT rotor 47 through a high speed shaft 62. At least (or only) the HPC rotor 46, the HPT rotor 47 and the high speed shaft 62 collectively form a high speed rotating assembly 64; e.g., a high speed spool of the engine core 42. This high speed rotating assembly 64 of FIG. 1 and its members 46, 47 and 62 are rotatable about the axis 24; however, it is contemplated the high speed rotating assembly 64 may alternatively be rotatable about another axis radially and/or angularly offset from the axis 24.

During operation, air enters the turbine engine 22 through an airflow inlet 66. This air is directed from the airflow inlet 66 and propelled by the propulsor rotor 44 through a propulsor flowpath 68 to an inlet 70 into a (e.g., annular) core flowpath 72 and an inlet 74 into a (e.g., annular) bypass flowpath 76. The propulsor flowpath 68 extends through the propulsor section 30. The core flowpath 72 of FIG. 1 extends sequentially through the LPC section 31A, the HPC section 31B, the combustor section 32, the HPT section 33A and the LPT section 33B from the core inlet 70 to a combustion products exhaust 78 out from the core flowpath 72 and the engine core 42. The air entering the core flowpath 72 from the propulsor flowpath 68 may be referred to as "core air". The bypass flowpath 76 of FIG. 1 extends through a (e.g., annular) bypass duct from the bypass inlet 74 to an airflow exhaust 80 out from the bypass flowpath 76. This bypass flowpath 76 and its bypass duct bypass (e.g., are disposed radially outboard of and extend along) the engine core 42. The air entering the bypass flowpath 76 from the propulsor flowpath 68 may be referred to as "bypass air".

The core air is compressed by the LPC rotor 45 and the HPC rotor 46 and is directed into a (e.g., annular) combustion chamber 82 of a (e.g., annular) combustor 84 in the combustor section 32. Fuel is injected into the combustion chamber 82 and mixed with the compressed core air to provide a fuel-air mixture. This fuel-air mixture is ignited and combustion products thereof flow through and sequentially drive rotation of the HPT rotor 47 and the LPT rotor 48 about the axis 24. The rotation of the HPT rotor 47 and the LPT rotor 48 respectively drive rotation of the HPC rotor 46 and the LPC rotor 45 about the axis 24 and, thus, compression of the air received from the core inlet 70. The rotation of the LPT rotor 48 also drives rotation of the propulsor rotor 44. The rotation of the propulsor rotor 44 propels the bypass air through and out of the bypass flowpath 76. The propulsion of the bypass air may account for a majority of thrust generated by the turbine engine 22, e.g., more than seventy-five percent (75%) of engine thrust. The turbine engine 22 of the present disclosure, however, is not limited to the foregoing exemplary thrust ratio.

Figure 2:
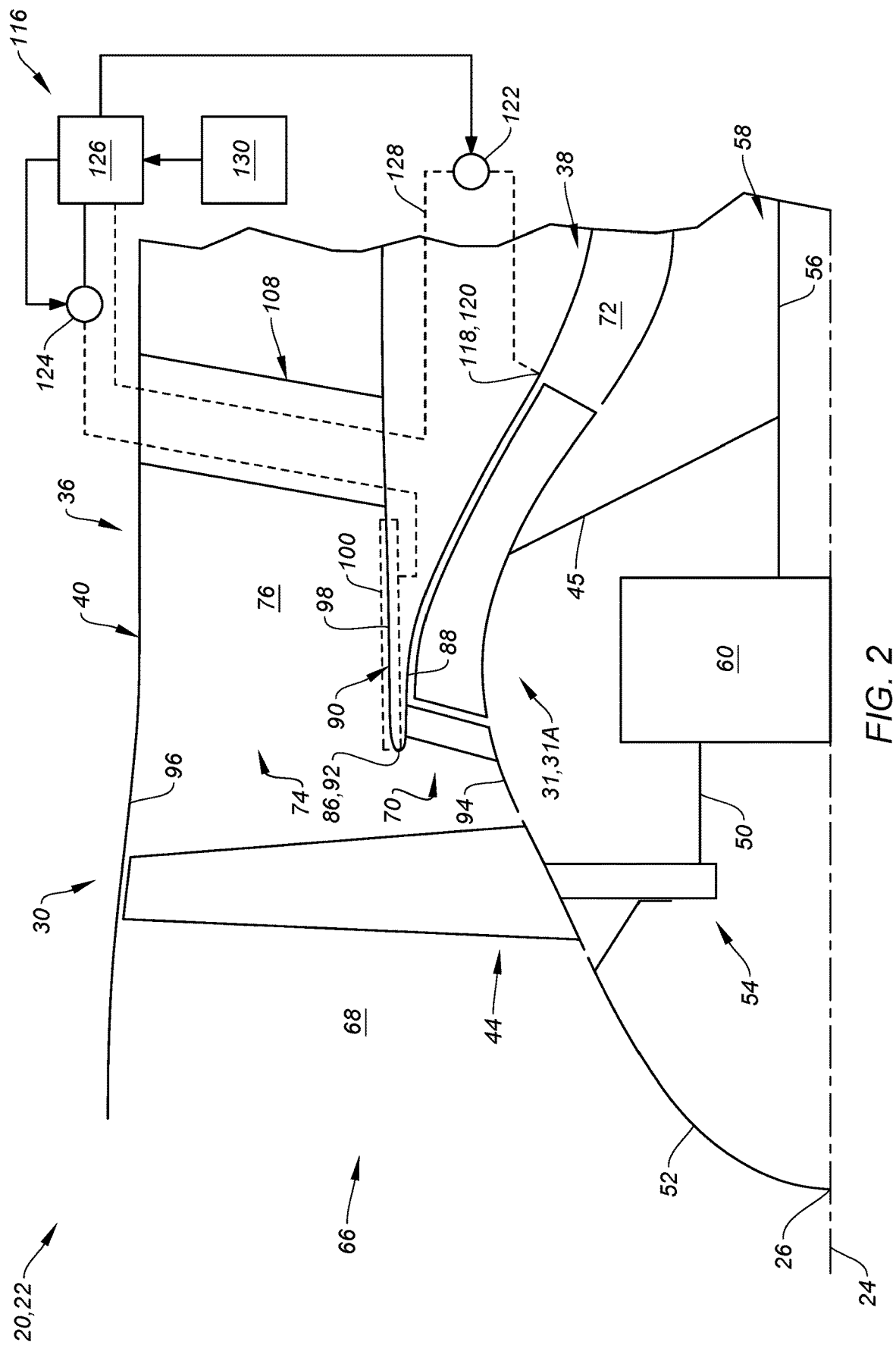
FIG. 2 is a schematic illustration of a portion of the powerplant at a splitter between flowpaths with an inflatable bladder.

Referring to FIG. 2, the airflow propelled by the propulsor rotor 44 out of the propulsor flowpath 68 is split into the core flowpath 72 and the bypass flowpath 76 by a splitter 86. This splitter 86 is a (e.g., annular) wedge-shaped structure of the engine housing 36 at a downstream end of the propulsor flowpath 68. The splitter 86 provides an intersection between a radial outer flowpath wall 88 of the core flowpath 72 ("core flowpath outer wall") and a radial inner flowpath wall 90 of the bypass flowpath 76 ("bypass flowpath inner wall"). The splitter 86 also forms a forward, upstream distal end of the core flowpath outer wall 88 and the bypass flowpath inner wall 90. The core flowpath outer wall 88 forms an outer peripheral boundary of at least a longitudinal (e.g., axial) section of the core flowpath 72 extending to the splitter 86 and/or the core inlet 70. This core flowpath outer wall 88 may also form a radial inner wall of the splitter 86. The bypass flowpath inner wall 90 forms an inner peripheral boundary of at least a longitudinal (e.g., axial) section of the bypass flowpath 76 extending to the splitter 86 and/or the bypass inlet 74. This bypass flowpath inner wall 90 may also form a radial outer wall of the splitter 86, where the core flowpath outer wall 88 and the bypass flowpath inner wall 90 may meet at a leading edge 92 of the splitter 86.

The splitter 86 is located radially between and radially spaced from a radial inner flowpath wall 94 of the inner housing structure 38 and a radial outer flowpath wall 96 of the outer housing structure 40. The inner flowpath wall 94 of FIG. 2 forms a radial inner peripheral boundary of the propulsor flowpath 68 between the propulsor rotor 44 and the core inlet 70. The inner flowpath wall 94 may also (or may not) extend longitudinally along at least an upstream section of the core flowpath 72 and form a radial inner peripheral boundary of the core flowpath 72 opposite the core flowpath outer wall 88. The outer flowpath wall 96 of FIG. 2 forms a radial outer peripheral boundary of the propulsor flowpath 68 radially outboard of the propulsor rotor 44. The outer flowpath wall 96 may also (or may not) extend longitudinally along at least an upstream section of the bypass flowpath 76 and form a radial outer peripheral boundary of the bypass flowpath 76 opposite the bypass flowpath inner wall 90.

The splitter 86, the inner flowpath wall 94 and the outer flowpath wall 96 each extends circumferentially about (e.g., completely around) the axis 24 providing that respective engine housing member 86, 94, 96 with, for example, a full-hoop geometry. With the arrangement of FIG. 2, the splitter 86 and the inner flowpath wall 94 form the core inlet 70, and the splitter 86 and the outer flowpath wall 96 form the bypass inlet 74. In particular, the inner flowpath wall 94 forms a radial inner peripheral boundary of the core inlet 70. The splitter 86 forms a radial outer peripheral boundary of the core inlet 70 radially opposite the inner flowpath wall 94. The splitter 86 also forms a radial inner peripheral boundary of the bypass inlet 74 radially opposite the outer flowpath wall 96. The outer flowpath wall 96 forms a radial outer peripheral boundary of the bypass inlet 74.

A ratio of the airflow flowing out of the propulsor flowpath 68 into the core flowpath 72 and the bypass flowpath 76 is related to several split line parameters. These split line parameters include, but are not limited to: a radial location of the splitter 86 between the inner flowpath wall 94 and the outer flowpath wall 96; a configuration (e.g., shape, dimensions, etc.) of the splitter 86 and its inner and outer walls (e.g., the core flowpath outer wall 88 and the bypass flowpath inner wall 90); a configuration of the inner flowpath wall 94; and a configuration of the outer flowpath wall 96. In a typical gas turbine engine, each of the foregoing split line parameters is fixed and is selected to provide a compromise in engine performance between various engine operating modes; e.g., part throttle, full throttle, etc. The turbine engine 22 of FIG. 2, by contrast, is configured with at least one adjustable split line parameter which may be changed during turbine engine operation based on, for example, its engine operating mode. The bypass flowpath inner wall 90 of FIG. 2 (e.g., the outer wall of the splitter 86), for example, is configured with a deformable radial outer surface 98.

Figure 3A:
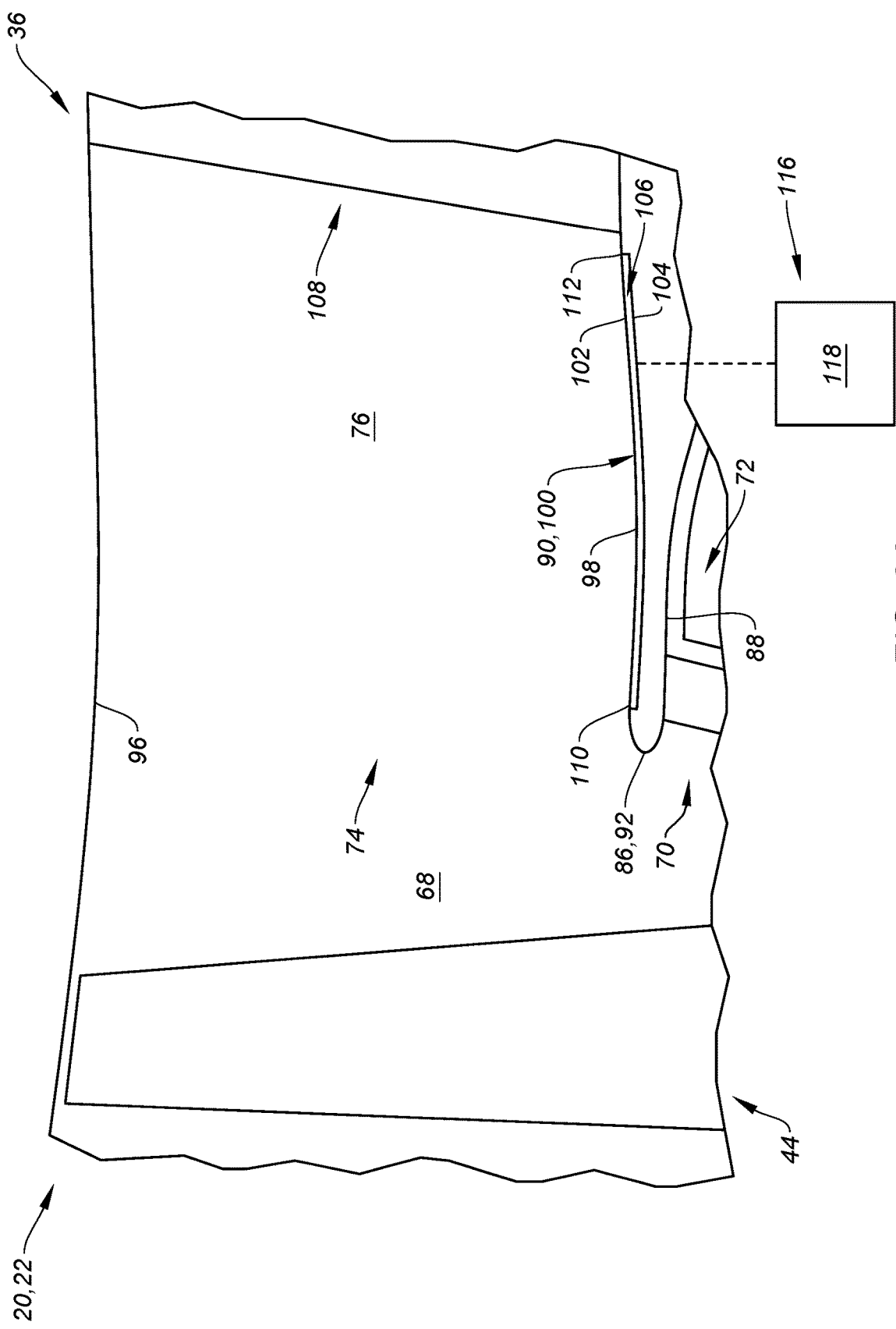
FIGS. 3A-C are schematic illustrations of a portion of the powerplant with the inflatable bladder in various arrangements.
Figure 3B:
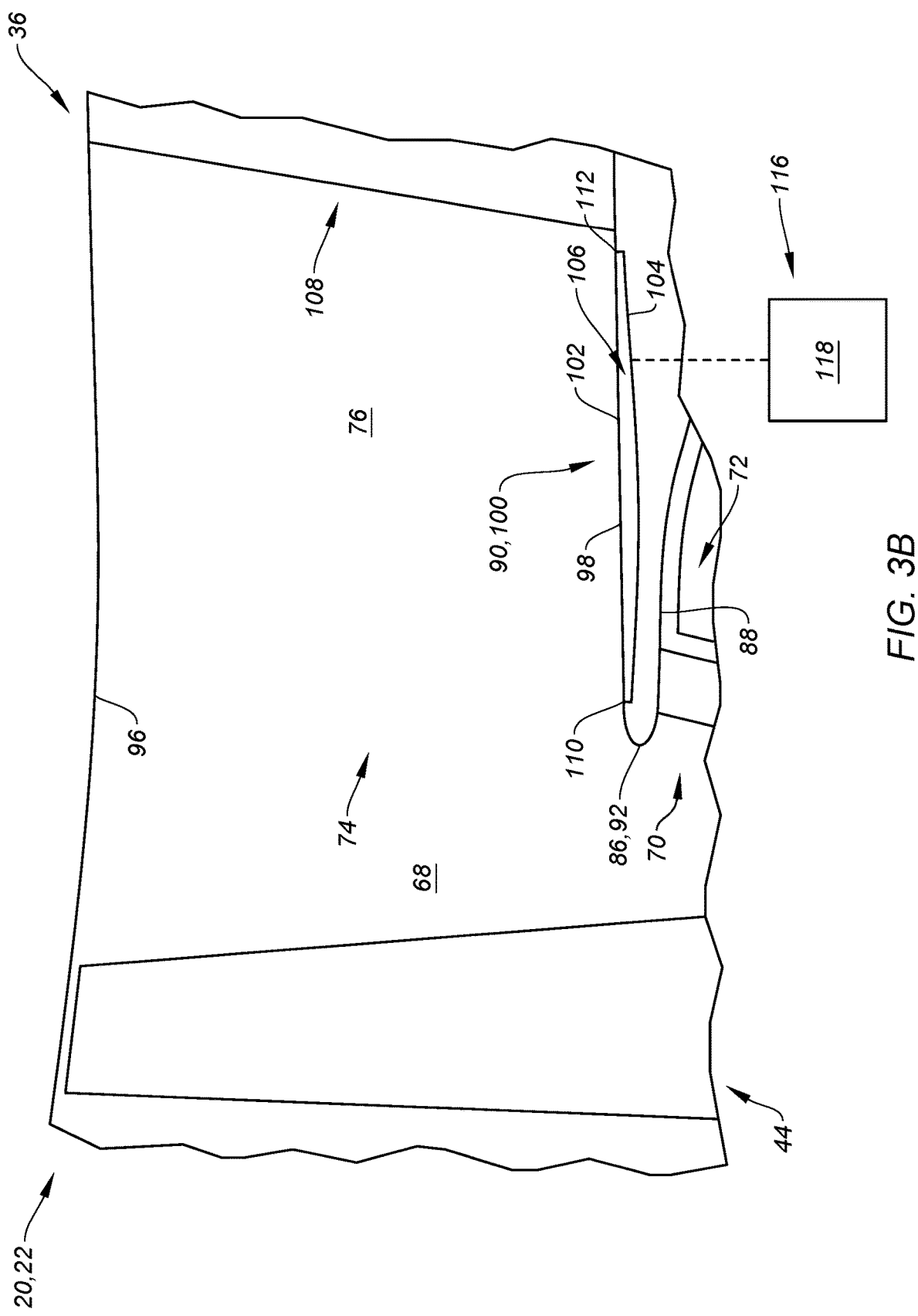
Figure 3C:
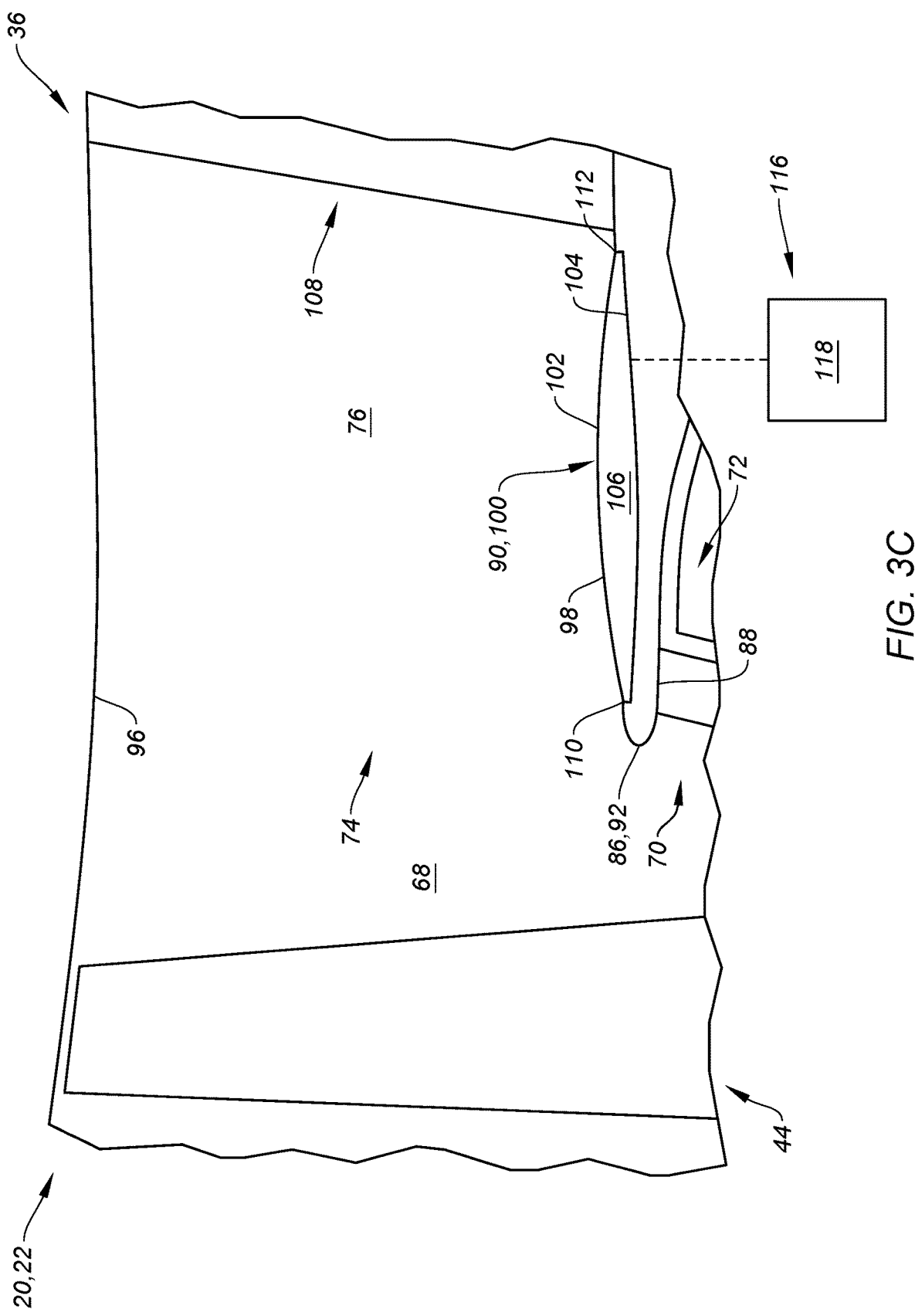

Referring to FIGS. 3A-C, the bypass flowpath inner wall 90 is configured with an inflatable bladder 100 located at (e.g., on, adjacent or proximate) the splitter 86 and the bypass inlet 74. This inflatable bladder 100 at least partially or completely forms the radial outer surface 98. The inflatable bladder 100 of FIGS. 3A-C, for example, includes a deformable face skin 102, a rigid backing 104 (e.g., a back skin, a support structure, etc.) and an interior volume 106.

The deformable face skin 102 extends from (or about) the splitter leading edge 92 to a point next to (or near) and upstream of an exit guide vane array 108 within the bypass flowpath 76. The deformable face skin 102 and, more generally, the inflatable bladder 100 may thereby be arranged along an upstream section of the bypass flowpath 76. The deformable face skin 102 extends circumferentially about (e.g., completely around) the axis 24 (see FIG. 2) providing the deformable face skin 102 with a full-hoop (e.g., tubular, cylindrical, frustoconical) geometry. The deformable face skin 102 of FIGS. 3A-C may thereby form at least a longitudinal section (e.g., axial section) of or an entirety of the radial outer surface 98 of the bypass flowpath inner wall 90 upstream of the exit guide vane array 108.

The deformable face skin 102 is constructed from a deformable and resilient material; e.g., a non-metal composite material. The deformable face skin 102, for example, may include a polymer matrix and fiber reinforcement embedded within the polymer matrix. The polymer matrix may be an elastomer such as rubber. The fiber reinforcement may include one or more woven or non-woven layers of long-strand, short-strand or chopped fibers; e.g., fiberglass fibers, carbon fibers, aramid fibers (e.g., Kevlar® fibers), or any combination thereof. It is contemplated, however, the deformable face skin 102 may alternatively be constructed from the polymer matrix with the fiber reinforcement to a side of the polymer matrix or even without the fiber reinforcement in select embodiments. The present disclosure, however, is not limited to such exemplary deformable face skin constructions or materials.

This rigid backing 104 extends longitudinally (e.g., axially) along the deformable face skin 102. The rigid backing 104 extends circumferentially about (e.g., completely around) the axis 24 (see FIG. 2) providing the rigid backing 104 with a full-hoop (e.g., tubular, frustoconical) geometry. This rigid backing 104 may be cast, machined, additive manufactured and/or otherwise formed as a metal hoop structure. Alternatively, the rigid backing 104 may be formed from shaped sheet metal. The present disclosure, however, is not limited to such exemplary rigid backing constructions or materials. For example, the rigid backing 104 may alternatively be formed from a rigid non-metal composite material.

The rigid backing 104 may be configured as, or may otherwise include, a backing wall and/or a back frame for the inflatable bladder 100. The deformable face skin 102 of FIGS. 3A-C, for example, is connected to the rigid backing 104 at or about opposing axial ends 110 and 112 of the inflatable bladder 100 and its members 102 and 104. At these connections/the ends 110 and 112, the deformable face skin 102 is also sealed (e.g., directly or indirectly) against the rigid backing 104. The interior volume 106 is thereby formed by the deformable face skin 102 and the rigid backing 104. The interior volume 106 of FIGS. 3A-C, for example, extends radially within the inflatable bladder 100 between and to the deformable face skin 102 and the rigid backing 104. The interior volume 106 of FIGS. 3A-C extends axially within the inflatable bladder 100 between and to the connections between the deformable face skin 102 and the rigid backing 104.

When the inflatable bladder 100 is deflated as shown in FIG. 3A, the interior volume 106 may substantially or completely collapse and the deformable face skin 102 may engage and lay against the rigid backing 104. However, when the inflatable bladder 100 is inflated as shown in FIG. 3C, the interior volume 106 grows in size and the deformable face skin 102 moves radially away from and is spaced from (e.g., at an axial center of the inflatable bladder 100) the rigid backing 104.

Referring to FIG. 2, the inflating and deflating of the inflatable bladder 100 is controlled by an air system 116 of the turbine engine 22. This air system 116 includes an air source 118 which is fluidly coupled to the interior volume 106 (see FIGS. 3A-C). The air source 118 may be configured as or otherwise include a bleed 120 from the compressor section 31; e.g., the LPC section 31A. However, it is contemplated the air source 118 may alternatively (or also) be configured as or otherwise include a standalone air compressor, a compressed air reservoir (e.g., tank) or the like. The air system 116 of FIG. 2 also includes one or more valves 122 and 124 and a control module 126 fluidly coupled inline along an air circuit 128 between the air source 118 and the inflatable bladder 100 and its interior volume 106. Here, the control module 126 is arranged between the valves 122 and 124. The upstream valve 122 is arranged between the air source 118 (e.g., the compressor bleed 120) and the control module 126. The downstream valve 124 is arranged between the control module 126 and the inflatable bladder 100. The control module 126 is configured to control operation (e.g., opening and closing) of the valves 122 and 124 based on, for example, control signal(s) received from an onboard controller 130 for the turbine engine 22; e.g., a full authority digital engine control (FADEC) or the like.

Figure 4A:
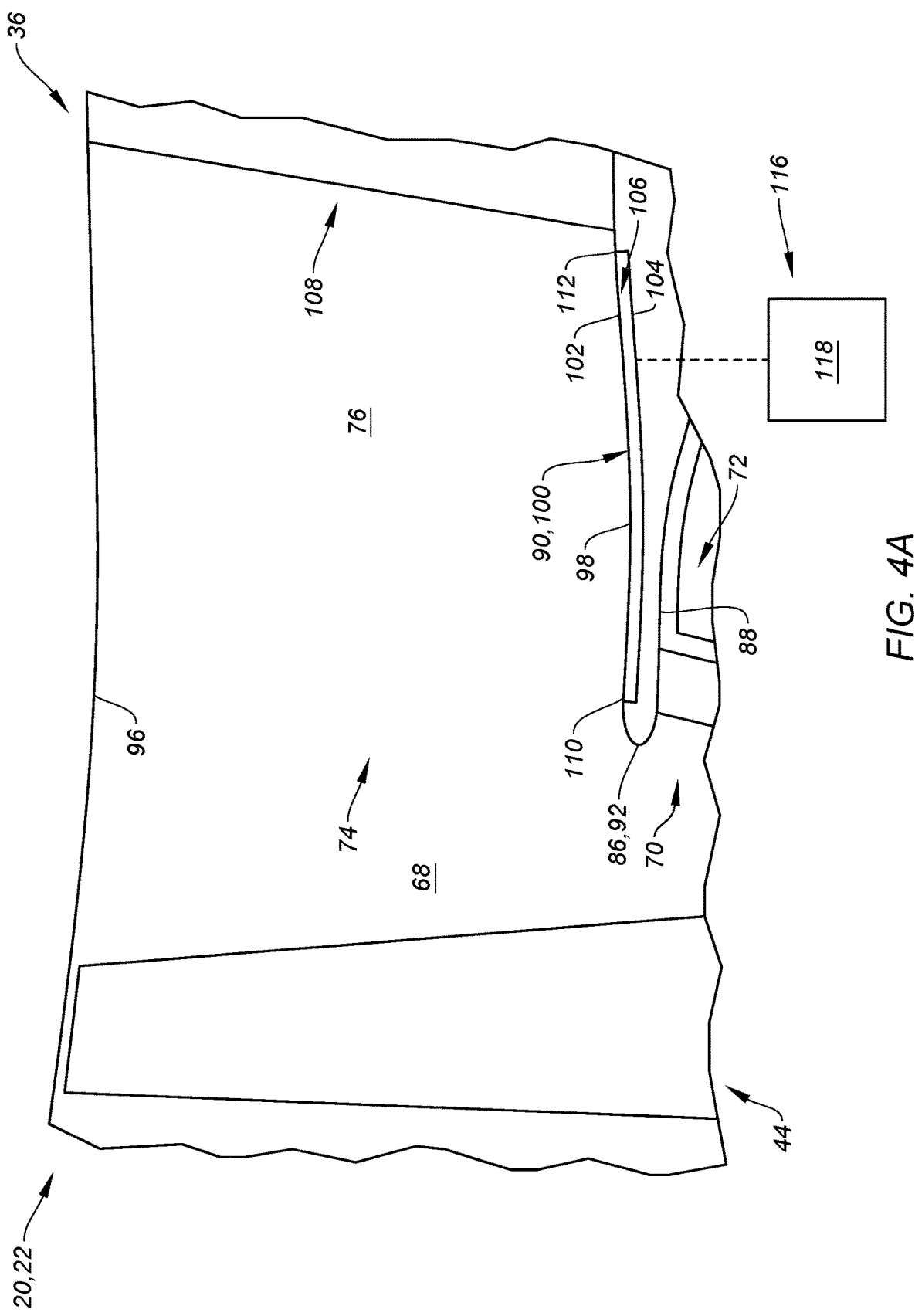
FIGS. 4A-C are schematic illustrations of a portion of the powerplant with another inflatable bladder in various arrangements.
Figure 4B:
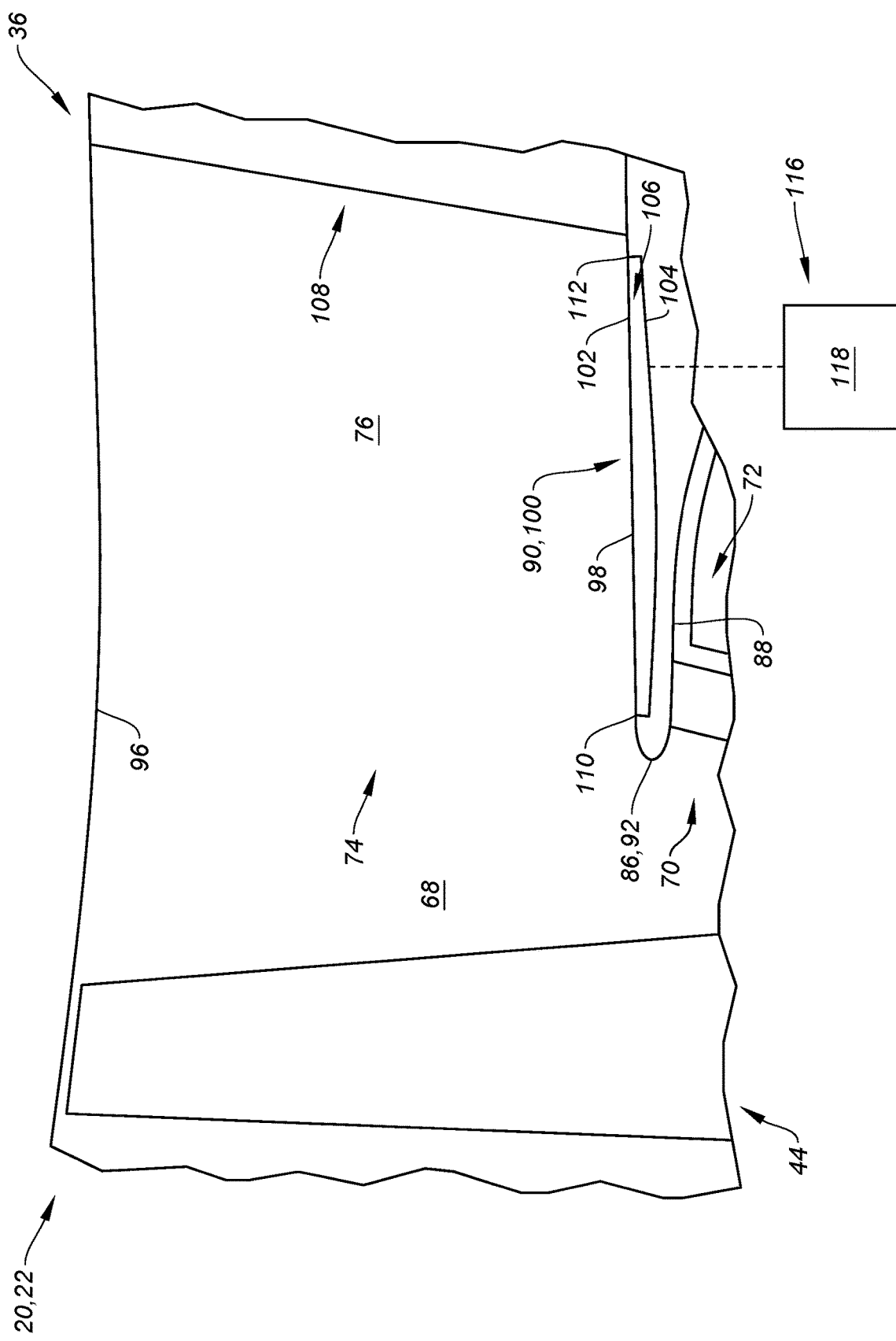
Figure 4C:
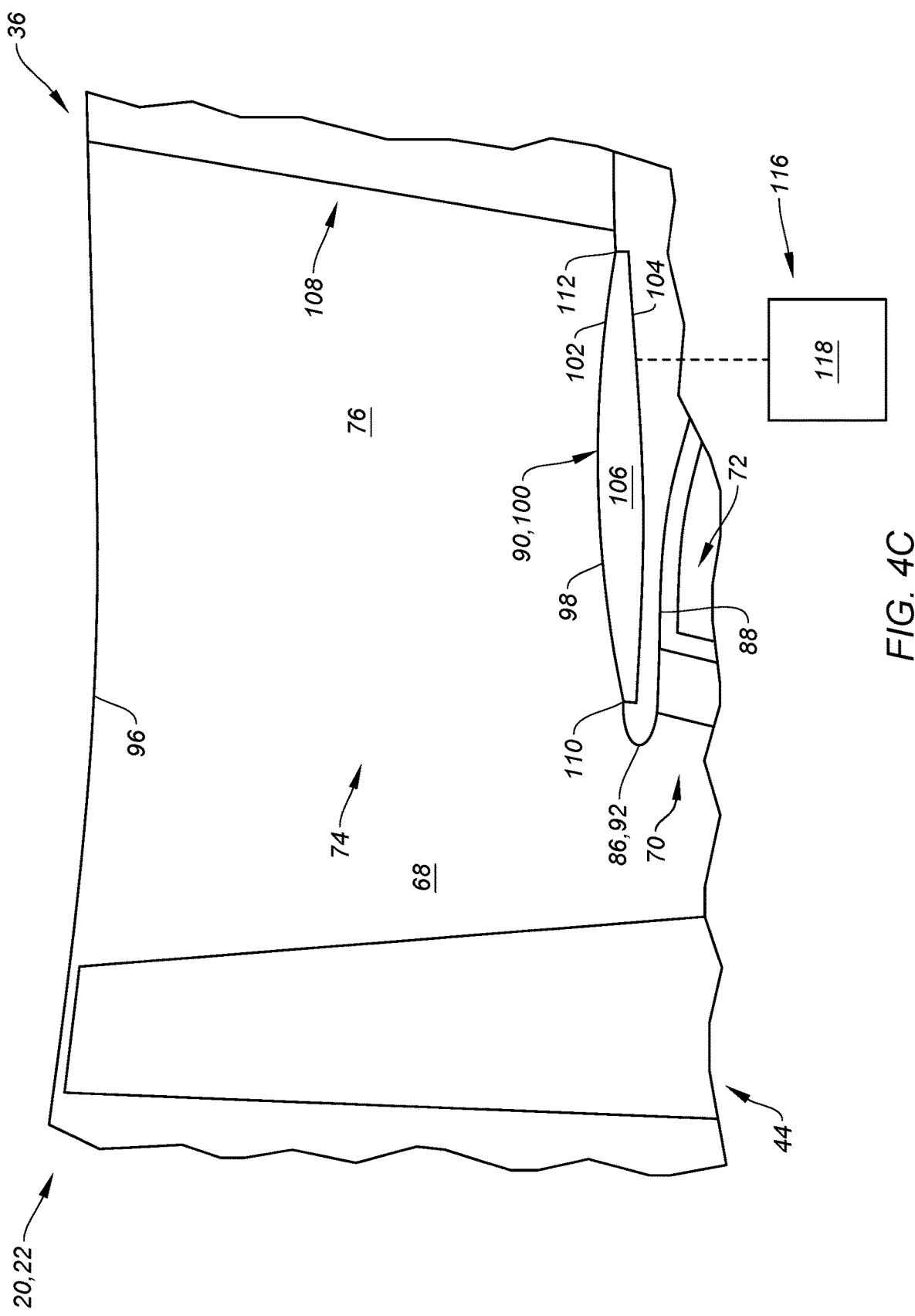

Referring to FIGS. 3A-C, the air system 116 is configured to direct air into the interior volume 106 to inflate the inflatable bladder 100; e.g., from the (e.g., fully) deflated arrangement of FIG. 3A to the partially inflated arrangement of FIG. 3B, from the partially inflated arrangement of FIG. 3B to the (e.g., fully) inflated arrangement FIG. 3C, etc. This inflation of the inflatable bladder 100 deforms the deformable face skin 102 and thereby changes a sectional geometry of the radial outer surface 98. More particularly, the inflation of the inflatable bladder 100 pushes (e.g., bulges) an axial center of the deformable face skin 102 radially outwards away from the axis 24 (see FIG. 2). Referring to FIG. 3B, with the inflatable bladder 100 partially inflated, the deformable face skin 102 and the radial outer surface 98 may have a straight-line geometry when viewed, for example, in a reference plane parallel with (e.g., including) the axis 24 (see FIG. 2). Referring to FIG. 3C, with the inflatable bladder 100 fully inflated, the deformable face skin 102 and the radial outer surface 98 may have a convex geometry when viewed, for example, in the reference plane The air system 116 is also configured to direct air out of the interior volume 106 to deflate the inflatable bladder 100; e.g., from the (e.g., fully) inflated arrangement FIG. 3C to the partially inflated arrangement of FIG. 3B, from the partially inflated arrangement of FIG. 3B to the (e.g., fully) deflated arrangement of FIG. 3A, etc. This deflation of the inflatable bladder 100 deforms the deformable face skin 102 and thereby changes the sectional geometry of the radial outer surface 98. More particularly, the deflation of the inflatable bladder 100 allows the axial center of the deformable face skin 102 to move (e.g., retract) radially inwards towards the axis 24 (see FIG. 2). Referring to FIG. 3B, with the inflatable bladder 100 partially inflated, the deformable face skin 102 and the radial outer surface 98 may have a straight-line geometry when viewed, for example, in the reference plane. Referring to FIG. 3A, with the inflatable bladder 100 (e.g., fully) deflated, the deformable face skin 102 and the radial outer surface 98 may have a concave geometry when viewed, for example, in the reference plane. Here, the sectional geometry of the deformable face skin 102 and the radial outer surface 98 may match a sectional geometry of the rigid backing 104. It is contemplated, therefore, the rigid backing 104 may alternatively be configured with another sectional geometry such that the deformable face skin 102 and the radial outer surface 98 may have a (e.g., slightly) convex geometry or a straight-line geometry when the inflatable bladder 100 is deflated. Moreover, while the deformable face skin 102 is described above as engaging (e.g., contacting) and laying against the rigid backing 104 when the inflatable bladder 100 is deflated, the present disclosure is not limited to such an exemplary configuration. For example, referring to FIGS. 4A-C, the rigid backing 104 may alternatively be radially spaced (e.g., recessed inward) from the deformable face skin 102 when the inflatable bladder 100 is (e.g., fully) inflated, partially inflated and (e.g., fully) deflated.

Referring to FIG. 2, to adjust the ratio and/or a position of a split-line stream line of the airflow flowing out of the propulsor flowpath 68 into the core flowpath 72 and the bypass flowpath 76, the air system 116 may be operated to selectively inflate or deflate the inflatable bladder 100. For example, referring to FIG. 3C, the air system 116 may (e.g., fully) inflate the inflatable bladder 100 to provide the radial outer surface 98 with its convex geometry when the turbine engine 22 is operating at a relatively low throttle setting; e.g., a relatively low thrust output. When operating at this relatively low throttle setting, airflow ingested into the core flowpath 72 may be relatively low and airflow directed into the bypass flowpath 76 may be moderate. In another example, referring to FIG. 3B, the air system 116 may partially inflate (or deflate) the inflatable bladder 100 to provide the radial outer surface 98 with its straight-line (or alternatively slightly convex) geometry when the turbine engine 22 is operating at a moderate throttle setting; e.g., a moderate thrust output. When operating at this moderate throttle setting, the airflow ingested into the core flowpath 72 may be moderate and the airflow directed into the bypass flowpath 76 may be moderate. In still another example, referring to FIG. 3A, the air system 116 may (e.g., fully) deflate the inflatable bladder 100 to provide the radial outer surface 98 with its concave (or alternatively straight-line) geometry when the turbine engine 22 is operating at a relatively high throttle setting; e.g., a relatively high thrust output. When operating at this relatively high throttle setting, the airflow ingested into the core flowpath 72 may be relatively high and the airflow directed into the bypass flowpath 76 may be relatively high.

Figure 5B:
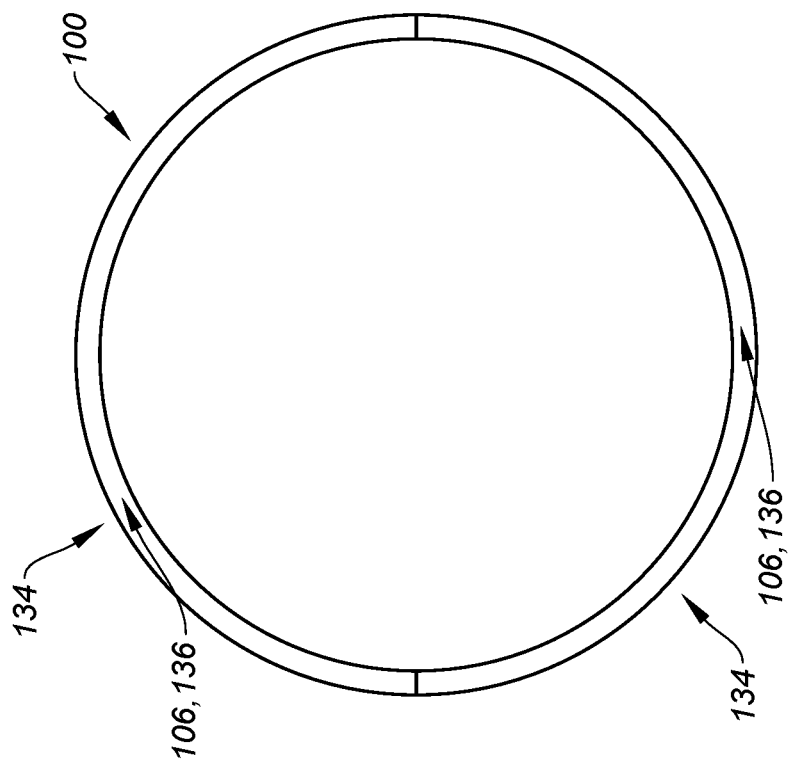
FIGS. 5A and 5B are schematic illustrations of various inflatable bladder configurations.
Figure 5A:
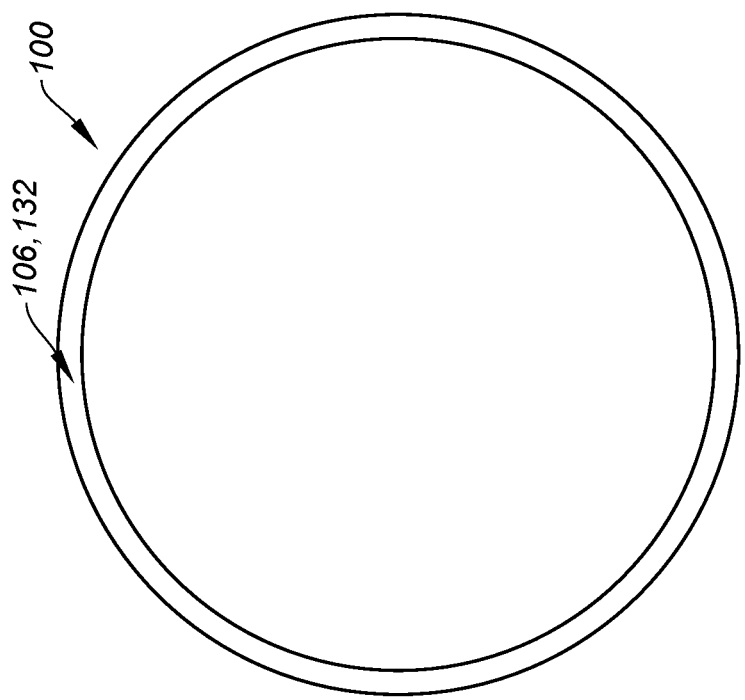

In some embodiments, referring to FIG. 5A, the inflatable bladder 100 may be configured with an annular interior volume 132 (e.g., 106). In other embodiments, referring to FIG. 5B, the inflatable bladder 100 may be configured into one or more circumferential sections 134; e.g., arcuate sections. Each circumferential section 134 may be associated with a fluidly discrete interior volume 136 (e.g., 106). With such an arrangement, the inflation/the deflation of the inflatable bladder 100 may be individually adjusted relative to circumferential position.

The inflatable bladder 100 and the air system 116 may be included in various turbine engines other than the one described above. The inflatable bladder 100 and the air system 116, for example, may be included in a turbine engine configured with a single spool, with two spools (e.g., see FIG. 1), or with more than two spools. The turbine engine may be configured as a turbofan engine, a turbojet engine with multiple flowpaths or any other type of turbine engine or other aircraft powerplant which would benefit from an adjustable split line.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   a compressor section;
   a bladed rotor rotatable about an axis;
   an inner flowpath comprising an inner flowpath inlet downstream of the bladed rotor, the inner flowpath extending through the compressor section;
   an outer flowpath comprising an outer flowpath inlet downstream of the bladed rotor, the outer flowpath inlet radially outboard of the inner flowpath inlet, the outer flowpath bypassing the compressor section;
   a splitter disposed radially between and partially forming the inner flowpath inlet and the outer flowpath inlet, the splitter forming an upstream, distal end of a flowpath wall; and
   the flowpath wall arranged with the splitter and forming a radial inner peripheral boundary of the outer flowpath, the flowpath wall comprising an inflatable bladder and a radial outer surface, the inflatable bladder configured to change a geometry of the radial outer surface, and the inflatable bladder located at the splitter.

2. The assembly of claim 1, further comprising an air system fluidly coupled to an interior volume of the inflatable bladder.

3. The assembly of claim 2, wherein the air system is configured to at least one of
   direct air into the interior volume of the inflatable bladder to deform the radial outer surface in a radial outward direction; or
   direct air out of the interior volume of the inflatable bladder to deform the radial outer surface in a radial inward direction.

4. The assembly of claim 2, wherein the air system is configured to bleed air from the inner flowpath at the compressor section and direct the air bled from the inner flowpath into the interior volume of the inflatable bladder.

5. The assembly of claim 1, wherein, when viewed in a reference plane parallel with the axis, the radial outer surface has a convex geometry with the inflatable bladder inflated.

6. The assembly of claim 5, wherein, when viewed in the reference plane, the radial outer surface has a straight line geometry with the inflatable bladder partially inflated.

7. The assembly of claim 5, wherein, when viewed in the reference plane, the radial outer surface has a concave geometry with the inflatable bladder deflated.

8. The assembly of claim 1, wherein the inflatable bladder includes a deformable face skin, a rigid backing and an interior volume radially between the deformable face skin and the rigid backing.

9. The assembly of claim 8, wherein the deformable face skin is configured to rest radially against the rigid backing with the inflatable bladder deflated.

10. The assembly of claim 8, wherein the deformable face skin is spaced radially from the rigid backing with the inflatable bladder deflated.

11. The assembly of claim 8, wherein at least one of
    the deformable face skin includes a polymer matrix and fiber reinforcement embedded within the polymer matrix; or
    the rigid backing comprises metal.

12. The assembly of claim 1, wherein the inflatable bladder is annular.

13. The assembly of claim 1, wherein the inflatable bladder is arcuate.

14. The assembly of claim 1, wherein
    the bladed rotor comprises a fan rotor;
    the inner flowpath comprises a core flowpath; and
    the outer flowpath comprises a bypass flowpath.

15. The assembly of claim 1, further comprising:
    an engine core configured to drive rotation of the bladed rotor about the axis, the engine core including the compressor section, a combustor section and a turbine section;
    the inner flowpath extending from the inner flowpath inlet, through the compressor section, the combustor section and the turbine section, to an inner flowpath exhaust from the inner flowpath; and
    the outer flowpath disposed outside of the engine core.

16. The assembly of claim 1, further comprising an air system fluidly coupled to the inflatable bladder, the air system being configured to change the geometry of the inflatable bladder based on a throttle setting of the aircraft propulsion system.

17. An assembly for an aircraft propulsion system, comprising:
    a bladed rotor rotatable about an axis, the bladed rotor comprising a fan rotor;
    an inner flowpath comprising a core flowpath and including a core flowpath inlet downstream of the bladed rotor;

an outer flowpath comprising a bypass flowpath and including a bypass flowpath inlet downstream of the bladed rotor, the bypass flowpath inlet radially outboard of the core flowpath inlet;

a flowpath wall downstream of the bladed rotor, the flowpath wall disposed radially between and partially forming the core flowpath inlet and the bypass flowpath inlet, the flowpath wall comprising an inflatable bladder and a radial outer surface that forms a radial inner peripheral boundary of the outer flowpath, and the inflatable bladder located at the bypass flowpath inlet;

the inflatable bladder configured to deform the radial outer surface such that, when viewed in a reference plane parallel with the axis, at least a portion of the radial outer surface is convex during a first mode; and at least the portion of the radial outer surface is concave during a second mode.

18. The assembly of claim 17, wherein the inflatable bladder is further configured to deform the radial outer surface such that, when viewed in the reference plane parallel with the axis, at least the portion of the radial outer surface is straight during a third mode.

19. An assembly for an aircraft propulsion system, comprising:

a propulsor rotor;

an engine core configured to drive rotation of the propulsor rotor about an axis, the engine core including a core inlet;

an outer flowpath downstream of the propulsor rotor and disposed outside of the engine core; and a flowpath wall forming a radial inner peripheral boundary of the outer flowpath, the flowpath wall forming a radial outer peripheral boundary of a core flowpath, the flowpath wall comprising an inflatable bladder and a radial outer surface, the inflatable bladder configured to deform the radial outer surface, the inflatable bladder disposed adjacent a bypass inlet, and the inflatable bladder disposed radially outward of the core inlet.

20. The assembly of claim 19, further comprising an air system fluidly coupled to the inflatable bladder, the air system being configured to change a geometry of the inflatable bladder based on a throttle setting of the engine core.

* * * * *